United States Patent [19]
Stephenson et al.

[11] Patent Number: 5,266,378
[45] Date of Patent: Nov. 30, 1993

[54] WHEEL POSITIONING GARAGE MAT

[76] Inventors: James Stephenson, E. 14207 - 22nd Ave., Veradale, Wash. 99037; Robert Simpson, E. 8710 Boardwalk La., Spokane, Wash. 99212

[21] Appl. No.: 883,106

[22] Filed: May 14, 1992

[51] Int. Cl.$^5$ .............................. B32B 3/00; B60T 3/00
[52] U.S. Cl. .................................. 428/156; 428/167; 428/192; 428/213; 428/218; 188/32; 5/417
[58] Field of Search ............... 428/156, 172, 167, 213, 428/119, 120, 141, 192, 218; 188/32; 5/417; 296/37.2

[56] References Cited

U.S. PATENT DOCUMENTS

| D. 280,611 | 9/1985 | Nelson | D12/217 |
|---|---|---|---|
| 2,465,551 | 3/1949 | Otterness | 188/32 |
| 2,681,377 | 6/1954 | Smithers | 428/167 |
| 2,746,571 | 5/1956 | Taylor | 188/32 |
| 2,813,600 | 11/1957 | Dyuricza | 188/32 |
| 2,956,646 | 10/1960 | Isgren et al. | 188/32 |
| 4,911,270 | 3/1990 | Hudson | 188/32 |

Primary Examiner—Donald J. Loney
Attorney, Agent, or Firm—Wells, St. John, Roberts, Gregory & Matkin

[57] ABSTRACT

A vehicle positioning garage mat is formed as a unitary structure, including a substantially rectangular mat, with an upper surface having forward and rearward transverse bumps formed integrally thereon. The mat is to be placed on a support surface in a selected position in the path of vehicle tire, to indicate a desired parking position for the vehicle. The mat includes a rearward bump, positioned along the length of the mat forward of a trailing edge, and a forward bump spaced forwardly of the rearward bump. A tab section is provided between the rearward bump and a trailing edge of the mat for initial engagement with a vehicle tire. The tab first receives a forwardly moving vehicle tire and thus secures the mat before the tire engages the rearward bump. The forward and rearward bumps are reinforced from below by spaced longitudinal rib sections that provide resilient resistance to depression, while minimizing the amount of material required for the mat. The density of material within the mat is concentrated at the bumps such that the durometer value of the material at the bumps is greater than the overall durometer of the mat between the bumps.

19 Claims, 2 Drawing Sheets

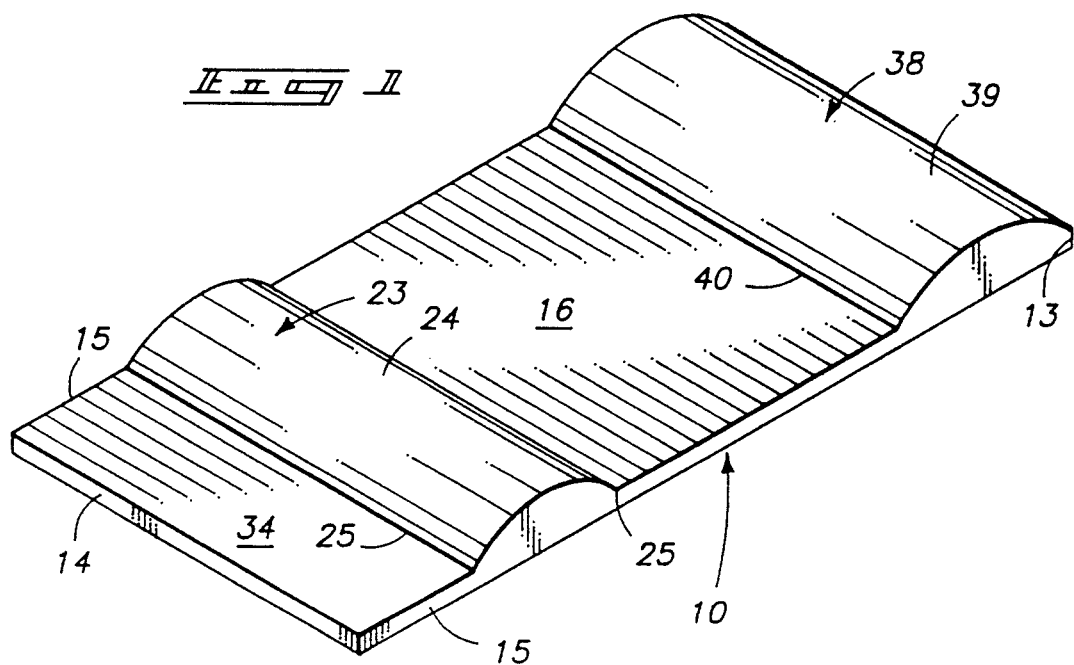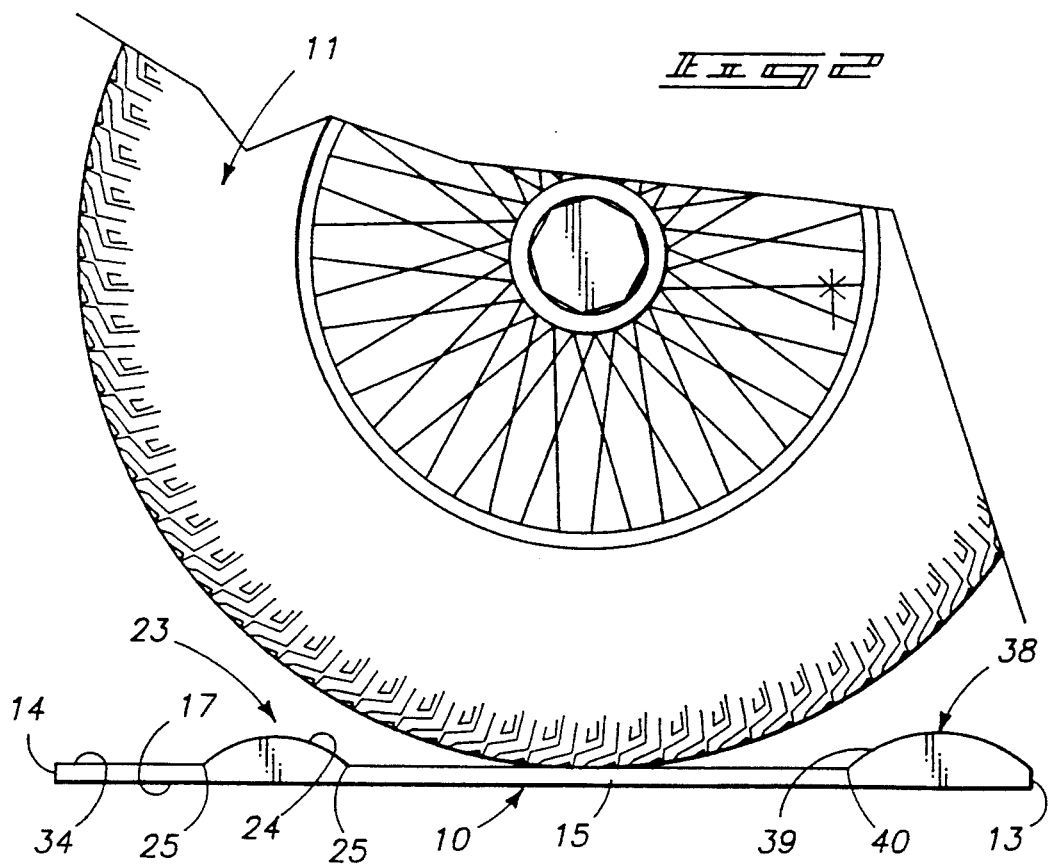

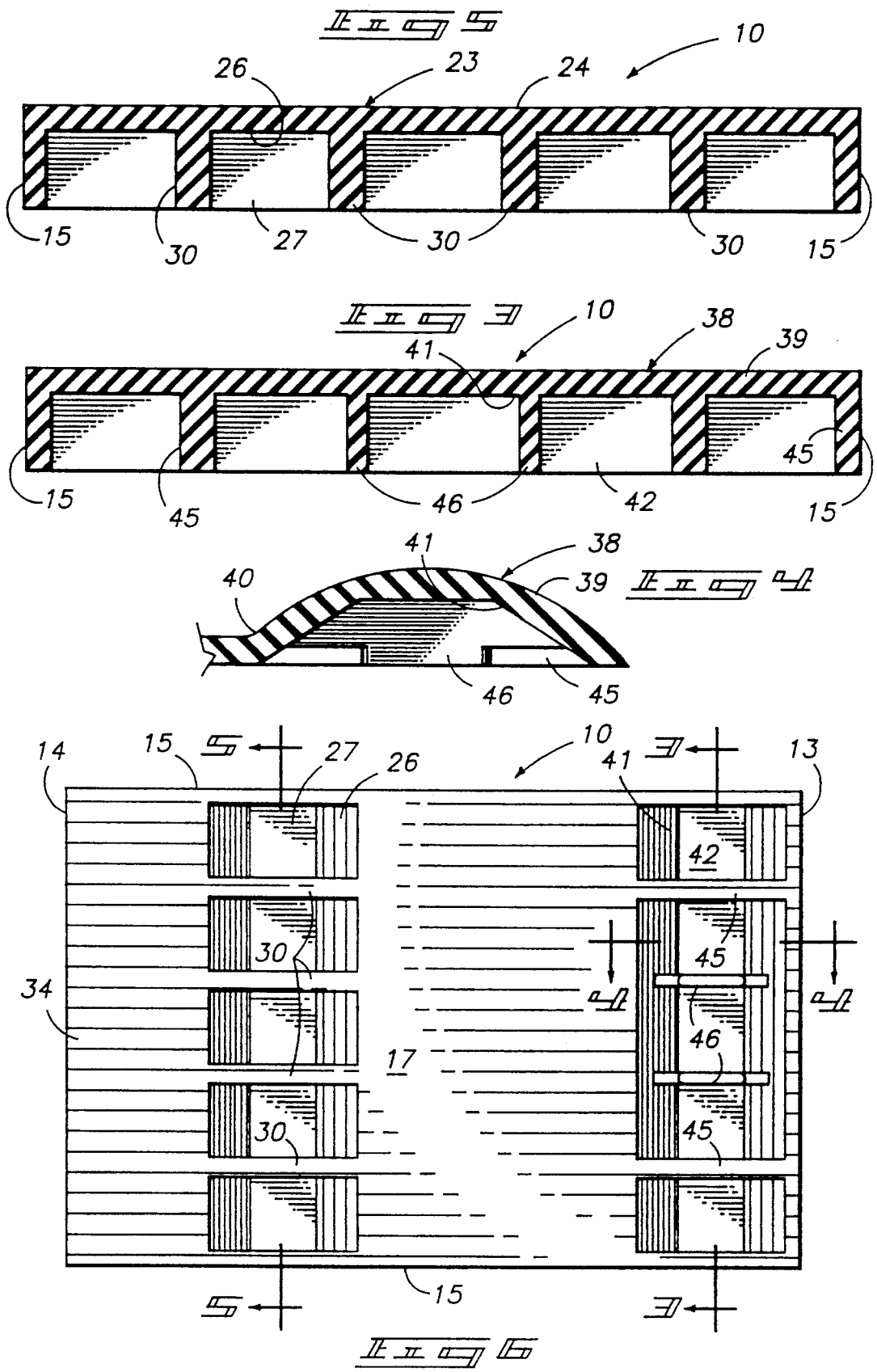

WHEEL POSITIONING GARAGE MAT

TECHNICAL FIELD

The present invention relates to apparatus utilized to indicate the position of a vehicle, and more particularly, to a floor mat positioned on a parking surface and including raised surfaces or bumps to indicate by "feel" when a vehicle is parked in a desired position.

BACKGROUND OF THE INVENTION

Conventional passenger vehicles have limited visibility from the drivers seat, especially in areas very close to the vehicle. Close proximity parking of such vehicles is difficult due to the lack of visibility of the forwardmost parts of the vehicle. This becomes a problem, especially when attempting to park a vehicle in a confined space such as a garage. This problem is amplified when there is a need to repeatedly park and remove the vehicle from the confined area.

At best, parking in such situations is a tedious task. Even when extraordinary caution is observed, accidents frequently happen. It is not unusual to move the vehicle too far into a confined area. This may result in bumping and damaging articles in front of the vehicle, or situating the vehicle so close to adjacent articles that free passage between the articles and the vehicle is restricted.

Another recognized difficulty is often realized when a vehicle is not moved far enough into a confined area. Rearward portions of the vehicle will project outward of the intended parking area. This is hazardous to the vehicle, especially in garages having overhead doors. If a vehicle is not moved far enough into such a garage, there is the potential that the door will come into contact with the vehicle. This can cause damage to the vehicle, the door, or both.

From the above, it may be understood that there is a need for some form of arrangement that will permit accurate parking on a consistent basis within confined areas. This holds true not simply for the typical garage situation, but also for any other area where it is desired to consistently and accurately execute vehicle parking.

The above problem has been recognized to limited degree. For example, U.S. Pat. Nos. 2,746,571 to Taylor; 2,813,600 to Dyuricza; 2,956,646 to Isgren; and U.S. Des. Pat. No. 280,611 to Nelson all disclose some form of wheel chock arrangement with an apron on which the wheel rides before it engages an abutment. Several of these patents describe the apron in the form of a mat. All describe the abutment as a means for stopping forward movement of the vehicle.

U.S. Pat. No. 2,465,551 to Otterness describes a wheel anchor having two angle arms for positioning a wheel therebetween. This "anchor" does not have an apron on which the wheel is positioned while engaging a stop.

Although the above references represent attempts at solutions to the vehicle positioning problem, there has remained a need for an improved vehicle positioning mat that is durable, capable of repeated usage under the extreme weight of passenger vehicles, and yet that is constructed in an inexpensive manner. There is further need for such a device with features allowing it to remain in a selected position through repeated usage, and which will therefor provide extremely accurate vehicle positioning.

It is therefore a first object of the present invention to provide a vehicle positioning mat that will reduce parking frustrations while maximizing desired space around the vehicle. A further object is to provide such a device that facilitates proper alignment of a vehicle within the confined area, such as a garage.

A still further object is to provide such a mat that will help eliminate unnecessary accidents within confined spaces, such as garages.

A still further object is to provide such a mat that is integral in design and formed of a wear resistant material to provide an inexpensive, yet effective device that will facilitate continuous and accurate positioning of passenger vehicles.

These and still further objects and advantages will become apparent from the following detailed description of the invention which, taken with the accompanying drawings, exemplify a preferred form thereon.

BRIEF DESCRIPTION OF THE DRAWINGS

A preferred form of the present invention is illustrated in the accompanying drawings in which:

FIG. 1 is a perspective view of a first preferred form of the present mat;

FIG. 2 is a side elevation view showing a vehicle tire in position between forward and rearward bumps on the mat;

FIG. 3 is an enlarged transverse sectional view taken through the forward bump of the present mat;

FIG. 4 is an enlarged fragmented longitudinal sectional view of the forward bump;

FIG. 5 is an enlarged transverse sectional view taken through the rearward bump of the present mat; and FIG. 6 is a bottom plan view of the mat.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

A mat exemplifying principal features of the present invention is shown in the accompanying drawings and is generally indicated therein by the reference numeral 10. The mat 10 is primarily intended to assist in positioning of vehicles in confined areas.

A particular area suited to use of the mat is along garage floors. However, it should be understood that the mat may be used on relatively any support surface that will additionally support a vehicle for the purpose of positioning the vehicle in an accurate, aligned position with respect to the surrounding environment. Other exemplary areas for use of the present mat might be open parking lots where vehicle spacing and proximity is important to most efficiently utilize the space available. Another area where the present mat may be used is, for example, in transportation of vehicles, such as trucking, railways, shipping, etc. where the vehicles must be accurately positioned for transport. Still further uses for the present mat will become obvious as vehicle positioning problems arise.

Referring now in greater detail to the features of the present invention, reference is made to FIG. 2. FIG. 2 indicates a vehicle tire 11 properly positioned on the present mat. The particular structure of the present mat permits such positioning with consistent accuracy due to the features of the invention exemplified in the drawings and which will be discussed in greater detail below.

The present mat 10 is preferably formed in a substantially rectangular configuration, with a forward edge 13 and a trailing edge 14 joined by substantially parallel longitudinal side edges 15.

The preferred mat includes a top aerial surface 16 (FIG. 1) and an opposed bottom surface 17 (FIG. 6). The mat is preferably constructed using a compression molding process from a single material, such as synthetic rubber. A grease and oil resistant synthetic rubber is preferred, such as "PARACRIL" TM, a nitrile synthetic rubber produced by "Uniroyal" and distributed by Hydro Rubber Company of Torrence, Calif. The preferred synthetic rubber material has the additional property of remaining flexible and resilient, even in cold climates.

The rubber material for the mat is molded using conventional techniques with particular densities created by variable pressure in the molding process to produce areas of varying hardness of "durometer" values at various selected locations along the length of the mat. A durometer value of the mat along flat portions thereof, in general, is within a range between 60 and 70 and preferably at approximately 65. Rearward and forward bumps 23 and 38 (described in more detail below) are integral with the mat yet include a somewhat higher density of the rubber material and therefore have a higher durometer value of between approximately 90 and 95.

The above-described unitary construction of the present mat 10 and the variable hardness of the selected areas of the mat lends particular advantages to the structure by way of minimal expense in production and consequent low cost to the ultimate purchaser. In addition, the unitary construction disclosed herein provides the additional advantage of near indestructibility in normal use with conventional passeger type vehicles.

The rearward bump 23 is formed with a convex curvature 24 projecting from the top surface 16. Opposite the convex curvature 24 is an adjacent complementary geometric concave surface 26 (FIG. 5) that forms an indentation 27 in the bottom surface 17 of the mat.

A first set of reinforcing ribs 30 are also integral with the mat and longitudinally span the indentation 27 under the rearward bump 23, as shown in FIGS. 3 and 5. The ribs 30 are spaced apart along the indentation 27 and are utilized for structurally reinforcing the bump. The ribs 30 include thickness dimensions (transverse to the length dimension of the mat) that are greater than the thickness dimension of the mat. The transverse thickness dimensions of the first set of ribs 30 is thus preferably greater than 0.125 inches.

The rearward bump 23 is located forwardly of the trailing mat edge 14. Its upwardly convex curved surface 24 joins the top surface 16 of the mat at fillets 25 that extend transversely across the width dimension of the mat. In fact, the entire rearward bump 23 has a lateral or transverse configuration across the mat such that the fillets 25 are substantially parallel to the transverse forward and trailing edges 13, 14.

A tab section 34 of the mat is located longitudinally between the trailing edge 14 and the rearward bump 23. The tab 34 is provided to facilitate initial engagement with the vehicle tire, enabling the received vehicle weight to secure the mat in position before the tire engages the rearward bump 23.

The tab section 34 assures consistent, accurate placement of the mat 10 on nearly any reasonably flat support surface by utilizing the weight of the vehicle to hold the mat in position as the rearward bump is engaged and rolled over by the vehicle tire.

It is preferred that the tab section 34 include a longitudinal dimension between the trailing edge and bump 23 (at the trailing fillet 25) preferably at least approximately 5.625 inches. This dimension is preferred in order to accommodate a preferred range of passenger car and light truck tire sizes, assuring that the tire will rest against the tab 23 so vehicle weight is applied to secure the tab section 34 (and thus the rest of the mat 10) before the tire engages the rearward bump 23.

The thickness dimension of the flat mat sections, such as at the tab section 34, and in the area between the forward and rearward bumps, is advantageously approximately 0.125 inches.

The forward bump 38 is situated along the length of the mat forward of the rearward bump 23 and rearwardly adjacent to the forward edge 13. The forward bump 38 includes a convex curvature 39 (FIG. 1) joining the top surface of the mat at a fillet 40.

The convex curvature 39 is advantageously the same as the convex curvature 24 of the rearward bump. In fact, both are preferably formed as arcs on substantially equal radii from transverse axes situated below the bottom surface.

The radii and positions for the central axes are selected so that the two bumps project above the top surface by distances within the range of one-half to one and one-half inches. The preferred height is advantageously approximately one inch. The radii of the arcuate bumps are both preferably approximately 3 inches.

Opposite the convex curvature of the forward bump is a concave configuration 41 (FIGS. 3, 4, 6) forming an indentation 42 along the bottom side of the mat. This configuration resembles the geometric concave configuration and indentation for the rearward bump 23.

A second set of ribs 45 is also provided to reinforce the forward bump 38. The ribs 45, like ribs 30, are integral with the mat. Two inward ribs 46 of the set 45 are formed with less thickness dimension than the outward ribs 45 of the set. The thickness dimension for ribs 46 is also less than that of the ribs 30 for the rearward bump, yet include greater thickness dimension than the remainder of the flat mat surfaces (preferably greater than 0.125 inches). This is done to minimize materials and to leave the forward bump "softer" than the rearward bump 23.

The preferred construction for the mat includes the rearward bump 23 being somewhat more rigid by provision of the first set of relatively thick ribs 30 and the durometer of the synthetic rubber than the forward bump 38 with the two central thinner ribs 46.

The forward bump is not intended as a wheel "chock" but is used simply as an indicator. The forward bump 38 offers only enough resistance to rolling motion of the vehicle tire to provide "feel" to help identify correct positioning of the vehicle tire once the rearward bump has been driven over. Therefore, less material is required for the forward bump 38 and expense in manufacture is further minimized.

The geometric nature of the concave sections 26 and 41 is noteworthy. The increased thickness of the bumps adjacent the areas where the bumps join the mat at the fillets 25 and 40 assure durability in those areas which, during normal use, would otherwise weaken and eventually crack.

The additional thickness of material at these areas provides greater resistance against such an occurrence.

Additional thickness in the referred areas is also beneficial in that these areas provide increased resistance to deflection (yet remain resilient) to clearly identify by "feel" the position of the vehicle tires.

Use of the invention begins after a simple set up procedure. The procedure starts with initial placement of the mat. A mat 10 may be positioned firstly by carefully locating the vehicle in a desired parking position.

The mat 10 is positioned laterally adjacent to one of the forwardmost vehicle tires in a position such that the "footprint" of the adjacent tire is situated longitudinally between the bumps. The vehicle is then moved rearwardly and the mat is slid laterally into the position previously occupied by the tire. The mat is then ready for use.

Alternatively, the installer may simply mark the position of the tire by outlining the "footprint" of the tire on the floor surface, move the vehicle rearwardly, then cover the marked spot with the mat 10.

The mat is to be oriented with the tab section 34 positioned facing the incoming direction of the vehicle. The tab section 34 will thus be first engaged by the tire as the vehicle is moved into position.

Once positioned, the mat will remain in the precise location so long as desired. This is assured even through constant usage by provision of the tab section 34 which allows the weight of the vehicle to firmly secure the mat in position prior to engagement between the rearward bump 23 and the vehicle tire. The weight of the vehicle pressing the mat tab 34 against the floor will therefore hold the mat in position as the tire moves over the rearward bump.

The tactile "feel" of the rearward bump indicates to the driver that the desired vehicle position has been reached. If the vehicle driver once again feels resistance to forward motion, the forward bump 38 has been engaged. The driver now knows that continued motion of the vehicle should be stopped.

The above referred process may be repeated with effective, consistent, and accurate results.

In compliance with the statute, the invention has been described in language more or less specific as to features of a preferred embodiment. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A wheel positioning garage floor mat, comprising:
   an elongated mat formed of flexible material and including a transverse forward edge spaced apart from a transverse trailing edge by substantially parallel longitudinal side edges, and opposed areal top and bottom surfaces bounded by the forward, trailing, and side edges;
   a rearward first bump, integral with the mat and formed as a convex curvature projecting from the top surface of the mat and an adjacent complementary concave surface formed as an indentation in the bottom surface of the mat;
   wherein the rearward first bump includes a first set of reinforcing ribs integral with the mat and located within the indentation, bracing the rearward first bump against deflection responsive to weight applied by a vehicle tire moving thereover;
   wherein the rearward first bump is located forward of the trailing edge, thereby defining a vehicle tire receiving tab portion along the mat between the rearward first bump and the trailing edge for initial engagement by a vehicle wheel to secure the mat in position on a garage floor;
   a forward second bump integral with the mat and formed as a convex curvature projecting from the top surface of the mat and an adjacent complementary concave surface formed as a second indentation in the bottom surface of the mat adjacent the forward edge and situated between the forward edge and the rearward first bump; and
   the forward second bump including a second set of reinforcing ribs integral with the mat and located within the second indentation, bracing the forward second bump against deflection responsive to weight applied by a vehicle tire moving thereover; and
   wherein the rearward first and forward second bumps include hardness values greater than that of the remainder of the mat.

2. A wheel positioning garage floor mat, as claimed by claim 1 wherein the first and second sets of reinforcing ribs have durometer hardness values greater than the remainder of the mat.

3. A wheel positioning garage floor mat, as claimed by claim 1 wherein the vehicle tire receiving tab portion includes a length dimension along the mat between the rearward first bump and the trailing edge of approximately 5.625 inches.

4. A wheel positioning garage floor mat, as claimed by claim 1 wherein the mat includes a thickness dimension at the tab section of approximately 0.125 inches.

5. A wheel positioning garage floor mat, as claimed by claim 1 wherein the mat includes a thickness dimension at the tab section of approximately 0.125 inches; and
   wherein the reinforcing ribs have a thickness dimension greater than the thickness dimension of the tab section.

6. A wheel positioning garage floor mat, as claimed by claim 1 wherein the mat includes a prescribed thickness dimension at the tab section; and
   wherein the reinforcing ribs have a thickness dimension greater than the thickness dimension of the tab section.

7. A wheel positioning garage floor mat, as claimed by claim 1 wherein the mat includes a prescribed thickness dimension at the tab section;
   wherein the reinforcing ribs have a thickness dimension greater than the thickness dimension of the tab section; and
   wherein the second set of reinforcing ribs include a pair of central ribs including a thickness dimension less than the thickness dimension of the reinforcing ribs of the first set.

8. A wheel positioning garage floor mat, as claimed by claim 1 wherein the mat includes a durometer hardness value of approximately between 60 and 95.

9. A wheel positioning garage floor mat, as claimed by claim 1 wherein the mat is formed of a synthetic rubber material as an integrated unit and wherein the first set of reinforcing ribs have a durometer hardness value greater than that of the remainder of the mat.

10. A wheel positioning garage floor mat, as claimed by claim 1 wherein the first and second sets of reinforcing ribs are oriented longitudinally with respect to the longitudinal side edges of the mat.

11. A wheel positioning garage floor mat, as claimed by claim 1 wherein the first and second sets of reinforcing ribs have higher durometer hardness values with respect to the remainder of the mat; and wherein the first and second sets of reinforcing ribs are oriented longitudinally with respect to the longitudinal side edges of the mat.

12. A wheel positioning garage floor mat, as claimed by claim 1 wherein the first set of reinforcing ribs have a durometer hardness value greater than that of the remainder of the mat; and wherein the first and second sets of reinforcing ribs are oriented longitudinally with respect to the longitudinal side edges of the mat.

13. A wheel positioning garage floor mat, as claimed by claim 1 wherein the forward second and rearward first bumps project upwardly from the mat top surface by distances within the range of ½ to 1.5 inches.

14. A wheel positioning garage floor mat, as claimed by claim 1 wherein the forward second and rearward first bumps project upwardly from the mat top surface by approximately 1 inch.

15. A wheel positioning garage floor mat, as claimed by claim 1 wherein the forward second and rearward first bumps project upwardly from the mat and are semicircular in lateral cross section, formed on substantially equal radii of approximately 3 inches.

16. A wheel positioning garage floor mat, as claimed by claim 1 wherein the forward second and rearward first bumps project upwardly from the mat top surface by distances within the range of ½ to 1.5 inches and wherein the durometer hardness of the material at forward second bump is within a range between approximately 60 and 70.

17. A wheel positioning garage floor mat, as claimed by claim 1 wherein the forward second and rearward first bumps project upwardly from the mat top surface by distances within the range of ½ to 1 inch and wherein the durometer hardness of the material at the rearward first bump is within a range between approximately 60 and 70, and the durometer hardness of the reinforcing ribs is within a range of approximately 90 and 95.

18. A wheel positioning garage floor mat, as claimed by claim 1 wherein the forward second and rearward first bumps project upwardly from the mat top surface approximately 1 inch and wherein the durometer hardness value of the material at the rearward first bump is approximately 65, and the durometer hardness value of the reinforcing ribs is within a range of approximately 90 to 95.

19. A wheel positioning garage floor mat, as claimed by claim 1 wherein the mat is rectangular and wherein the bumps are arcuate, formed on radii from central axes transverse to the mat and spaced below the bottom surface of the mat.

* * * * *